United States Patent [19]
Usher

[11] 3,765,419
[45] Oct. 16, 1973

[54] AMYLOSE ACETATE
[75] Inventor: Francis C. Usher, Houston, Tex.
[73] Assignee: International Paper Company, New York, N.Y.
[22] Filed: May 14, 1971
[21] Appl. No.: 143,616

[52] U.S. Cl. .................... 128/325, 424/15, 424/180, 128/1 R
[51] Int. Cl. A61b 17/12, A61b 17/00, A61k 27/00
[58] Field of Search .................... 128/1 R, 156, 296, 128/325, 334 R; 424/15, 180

[56] References Cited
UNITED STATES PATENTS
2,597,011  5/1952  MacMasters et al. ......... 128/296 UX FOREIGN PATENTS OR APPLICATIONS
900,868  7/1962  Great Britain .................... 128/325

Primary Examiner—Channing L. Pace
Attorney—Louis F. Reed

[57] ABSTRACT

A novel process for providing surgical hemostasis. In the process, an acetylated amylose with a critical range of acetate is employed.

5 Claims, No Drawings

AMYLOSE ACETATE

DESCRIPTION OF THE PRIOR ART

Amylose acetate is an ester of amylose, the linear fraction of starch. Amylose comprises about 25 percent of the whole starch. The acetate is obtained by acetylation of amylose with acetic anhydride as described, for example, by Jeanes et al. in the *Journal of the American Chemical Society*, Vol. 74, pages 6116–6117 (1952) or by Wolff et al. in the *Journal of the American Chemical Society*, Vol. 13, pages 346–349 (1951). A fully acetylated amylose, viz. amylose triacetate, has a D.S. (degree of substitution) of 3 which is equivalent to a theoretical acyl content of 44.8%. D.S. can be readily determined from a known acetyl percentage as follows:

$$\frac{\frac{\% \text{ Acetyl}}{43}}{\frac{(100-\% \text{ acetyl})}{162}} = \text{D.S.}$$

In the above equation, "43" represents the molecular weight of the acetyl group; "162" represents the molecular weight of the anhydroglucose unit.

Films of amylose triacetate are disclosed by Whistler et al. in the *Journal of the American Chemical Society*, 65, page 1436 (1943). Wolff et al. in *Industrial and Engineering Chemistry*, 49, pages 1247–1248 (Aug. 1957) discloses films of both amylose triacetate and mixed esters of amylose.

Amylose acetates of varying degree of acetate substitution are known. Thus, Cowie et al. in *Die Makromolekulare Chemie*, Vol. 121, pages 51–57 (1969) disclose amylose acetates having a D.S. of 1.6 and 3.0. Muetgurt et al. in *Die Starke*, Vol. 10, pages 303–304 (1958) disclose a partially acetylated amylose. Wagner et al. in the *Journal of the American Pharmaceutical Association*, Vol. XLVIII, No. 4, pp. 244–249 (Apr. 1959) disclose amylose acetate phthalates useful in enteric coatings. In preparing the amylose acetate phthalates, amylose is acetylated to a D.S. of 1.11 to 2.67 and then reacted with phthalic anhydride.

Materials used today for applying to open wounds and incisions are prepared from heterologous protein as the submucosal layer of the intestine of sheep (catgut) or the Achilles tendon obtained from cattle (soluble collagen). Oxidized cellulose is also employed. These materials act as foreign bodies and can cause considerable inflammatory reaction in tissues. Mihaly Gerendas, in a book entitled "Fibrinogen," edited by Kolomani Laki, published in 1968, discloses that inadequate hemostasis represents a problem, not only in cases of clotting disorders, but often in normal surgical procedures because diffuse, parenchymatous bleeding is very troublesome. Fibrinogen and thrombin preparations in different forms are suggested to aid hemostasis.

British patent 900,868 discloses amylose sponges and gauze. U.S. Pat. No. 3,499,074 produces amylosic starch filaments from an aqueous dispersion of "amylosic solids," which is defined as any mixture of filament-forming solids which includes at least about 50 percent by weight of pure amylose or an amylose derivative such as amylose ether, ester or anhydride. The patent teaches that the disclosed filaments are not toxic and can be digested by humans and other living systems, and thus satisfy the requirements for use in specialized applications as medical sutures or bandages. A hydroxypropyl derivative of a high amylose starch mixed with 4 percent glycerine and 26 percent water is specifically disclosed in the patent for forming amylosic monofilaments. Other patents concerned with wound treating are U.S. Pat. No. 3,328,259 which shows the use of a film containing a water-soluble cellulose compound to promote coagulation and U.S. Pat. No. 3,470,295 which discloses the use of maltose, inositol, and sorbitol in the treatment of humans and animals for hemorrhage.

The prior art relating to wound application suffers from a number of disadvantages. These include inefficient hemostasis, for example, because of absorption of the applied agent too quickly or poor absorption of the applied agent, intorduction of foreign bodies, too much tissue response, and/or high expense.

SUMMARY OF THE INVENTION

It is an object of the invention to provide an efficient process for surgical hemostasis.

Another object of the invention is to provide an economical process for providing surgical hemostasis using a material that is digested by enzymes, as amylase and diastase, present in the tissue fluids of humans and animals.

Still another object of the invention is to provide a process which stops hemorrhaging of a wound within a few minutes after application.

It is still another object of the invention to provide a hemostatic surgical product which is not absorbed by the body too quickly to lose its effectiveness but is absorbed in the body in a short period of within a matter of only a short number of days, usually 3 or 4 days, with minimal tissue response and without tending to cause infections which prior art hemostatic agents tend to cause. This permits the use of large amounts of the hemostatic surgical product of the invention since it is sufficiently rapidly absorbed by the body without untoward results.

Another object of the invention is to provide an absorbable hemostatic surgical product which degrades into glucose, a normal constituent of human and animal tissue fluids, and small amounts of acetic acid that cause little or no tissue reaction.

It is yet another object of the invention to provide an absorbable hemostatic surgical product which is supple and elastic during application to ensure good contact with a profusely bleeding wound and promote hemostasis.

A further object of the invention is to provide an absorbable hemostatic surgical product that sticks tenaciously to the wound and/or surrounding tissue.

It is also an object of the invention to provide an absorbable hemostatic surgical product that is easily and reliably sterilized.

Briefly the present invention concerns depositing on the surface of a wound, incision or lesion a partially acetylated amylose with a critical acetate range.

DETAILED DESCRIPTION OF THE INVENTION

According to the present invention, partially acetylated amylose having a D.S. of between about 0.2 and about 1.5, preferably between about 0.2 and 0.6, is applied to the surface of a wound, incision or lesion. In application, the amylose acetate is desirably in the form of a film, preferably one of about 1 to 4 mils thick and desirably having a number of perforations in the film. Thicker films are less desirable since they have less tendency to conform to the surface of the wound and may not provide intimate contact. The surface being treated need not be completely covered with the amylose acetate, although it is desirable that the extent of the wound, incision or lesion be covered by the amylose acetate and that the film cover at least some of the adjacent surrounding tissues. If desired, more than one sheet of a perforated film may be superimposed over the wound, etc., or parts of two or more films of amylose acetate may overlap.

For obtaining the amylose acetate, amylose is desirably acetylated in a heated formamide solvent, using sodium acetate as the catalyst, in reaction with acetic anhydride. The procedure is derived from A. Jeanes and R. Jones as published in *Journal of American Chemical Society*, Vol. 74, page 6116 (1952). By controlling the amount of acetic anhydride used, amylose acetates containing the critical acetate range (degree of substitution), are obtained.

Amylose acetate films can be made by casting directly the amylose acetate from a filtered, deaerated formamide solution of the amylose acetate. Concentrations of about 20 percent by weight of amylose acetate are desirable. Alternatively, amylose acetate from a filtered, deaerated formamide solution is precipitated in water or acetone, then redissolved in dimethylsulfoxide, the solution deaerated and films cast therefrom.

The films are cast by drawing the amylose acetate solution onto highly polished ferrotype plates which had been sprayed with silicone release agent. Cast films are regenerated by placing the plates in water. The films may be dried in the oven at 65°C. and stripped from the plates.

For application to a wound, incision or lesion a respective film is perforated, sterilized by chemical sterilizing agents, such as gas sterilization, with ethylene oxide at a temperature of about 80–100°F. for several hours, and then placed on a wound. The films are desirably perforated with small holes so as to prevent the entrapment of air bubbles below the surface of the film of amylose acetate. The films are held in place for a few minutes during which time they form a sticky, elastic coating which sticks tenaciously to the wound and stops any bleeding. If bleeding is not stopped with sufficient rapidity, an additional perforated film may be placed over the first film. Iodine staining readily indicates that the film has been absorbed.

Further details of the invention are illustrated by the following examples which represent various embodiments. All proportions given are by weight unless otherwise indicated.

EXAMPLE 1 a. Preparation of amylose acetate films i. Ninety grams of Superlose, a 95% amylose starch fraction, were mixed in 400 milliliters of formamide at 23°C. for 30 minutes in a one-liter resin kettle. The mixture was heated to 95°–100°C. by placing the resin kettle in a hot water bath. It took 30 minutes to reach 98°C. 15 grams of anhydrous sodium acetate were added to the mixture and the mixture mixed at 98°C. for 30 minutes. One hundred milliliters of acetic anhydride were then added dropwise to the mixture over a 15 minute period. The reaction was stirred an additional 60 minutes at 98°C. with the reaction proceeding as evidenced by the amylose going into solution. Over the next 60 minutes, the mixture cooled to 30°C. 100 milliliters of formamide and 10 milliliters of water were subsequently added and the mixture stirred for 30 minutes. The solution was filtered through a dacron cloth on a Buchner funnel to remove grit and the solution deaerated in a vacuum desiccator.

Films of the amylose acetate dissolved in an amount of about 20 percent by weight in formamide were cast on Kindermann Ferrotype plates treated with a silicon spray release agent and using a Boston Bradley draw down bar with clearance adjusted with a microscope glass slide. The plates were then placed in the oven at 65°C. The plates with the adhering films were conditioned at room temperature for at least 15 minutes and then the films were stripped by hand from the plates and trimmed. The films were prepared having a thickness of between about 1 and 4 mils. The films were regenerated by placing the drawn liquid films in distilled water overnight.

In this manner, a film (186 JM 45-A) of amylose acetate with a D.S. of 0.906 was prepared.

ii. In an alternative procedure, 200 milliliters of the deaerated, filtered formamide solution from (i) were poured slowly into 1200 milliliters of acetone and an additional 800 milliliters of acetone were added. The amylose acetate precipitate settled and the clear liquid decanted off. The precipitate was mixed twice, each time with 1000 milliliters of acetone, and the clear liquid decanted off. The precipitate was then recovered by filtration, washed with 300 milliliters of acetone and pressed. Yield was 73.0 grams wet (3.6 grams wet is equivalent to 1.60 grams dry).

Dried powder was dissolved in dimethylsulfoxide (DMSO) to form a 15 percent solution. The solution was cast as in (i). In this manner, a film of amylose acetate with 0.654 D.S. was prepared.

iii. In yet a third procedure, 200 milliliters of the deaerated, filtered formamide solution from (i) were poured slowly into 2000 milliliters of water. The amylose acetate precipitate settled and the clear supernatant liquid decanted off. The precipitate was washed four times, each time with two liters of water, then filtered and pressed. The powder, slurried with a minimum amount of water, was put into freeze dry bottles and freeze dried to yield a fine powder. The powder can then be used to provide films cast as in (ii) from a 20 percent solution of the powder in DMSO.

Films produced in accordance with this and the other examples herein were gas sterilized prior to use by first evacuating a chamber containing the perforated films and then introducing ethylene oxide gas into the chamber and maintaining the chamber and its contents at a temperature of 85°F. for 3 hours at a slightly elevated pressure.

b. Hemostatic Action of Films

A tangential section of the liver of a dog (animal No. 8552) was excised (about 1 × 2 inches) and two (2) sheets of amylose acetate film of about 2–3 mils thickness with a D.S. of 1.25, produced in a manner substantially similar to part (i) of this example, were applied over the wound. Bleeding immediately stopped. The same procedure was done on the dog's spleen. Bleeding immediately stopped, although a somewhat longer time was taken for the hemostasis.

An autopsy of the dog 3 days later showed no blood in its abdomen. Also, there were few omental adhesions to the spleen and none to the liver. Cut surfaces of the liver and spleen were free of blood clots. There was no evidence of the applied film, it having been absorbed by the dog's tissue fluids. Both cut surfaces were smooth and appeared well organized.

EXAMPLE 2

A midline incision on a dog (animal No. 8269) was made. One large piece was cut from the spleen. Amylose acetate film of D.S. 0.906 (produced in accordance with Example 1a(i)) was applied to the bleeding surface. The bleeding stopped in 10 to 15 minutes. The dog was then closed and given penicillin and streptomycin. An autopsy of the dog 6 days later showed no blood in the abdomen.

A section of the rectus muscle of the same dog was excised and another amylose acetate film of D.S. 0.906 applied to the cut muscle surface. The bleeding stopped.

A section of the spleen of the same dog was excised and amylose acetate film of D.S. of 0.906 was applied. The bleeding stopped.

EXAMPLE 3

A midline incision on a dog (animal No. 8627) was made. Two (2) pieces were excised from the liver and spleen and replaced with perforated amylose acetate film (about 2–3 mils thick) of D.S. 0.906. The bleeding stopped in 10 to 15 minutes. The wound was closed and the dog given penicillin and streptomycin. An autopsy of the dog 6 days later showed no blood in the abdomen.

The liver of the same dog was cut and another film of amylose acetate of D.S. 0.906 was applied over the wound. The bleeding stopped. Iodine test for starch made 6 days later on a healthy surface of the spleen was negative for starch.

EXAMPLE 4

A midline incision on a dog (animal No. 660) was made. The recti sheaths on each side of the midline were opened and the recti muscles split. Each incision was 8 inches long. On the left side a piece of amylose acetate film of D.S. 0.26 (produced in accordance with Example 1a(i), but using less acetic anhydride) measuring 6 × 1 inch (perforated film of 2–3 mils thick folded four times) was implanted between the recti muscles and transversalis fascia. The rectus fascia (interior) was closed with three-strand coated wire suture. On the right side (control), no implantation was made, although the same type of closure was made. Pencillin and streptomycin were given to the dog.

An autopsy of the dog three days later showed no visible trace of the amylose acetate film previously implanted deep into the rectose muscle. The wound was repeatedly swabbed with saline moistened gauze sponge to test for free starch — 6 separate sponges being used. No trace of starch was found in the wound. The Combistix test strip showed no free glucose present. Thus the amylose acetate had been completely absorbed. The control wound had the same appearance as the implanted wound.

EXAMPLE 5

A midline incision, 10 inches long, was made on a dog (animal No. 720). Then a rectus sheath on both sides was incised for 8 inches and both recti muscles split longitudinally for 8 inches. A 6 inch roll of amylose acetate film of D.S. 0.32 (about 4 to 6 folds) was implanted in each incision. The rectus sheath was then closed with running 7-strand No. 0 coated wire suture. Then the subcutaneous space was filled with amylose acetate film of D.S. 0.32 for 10 inches length and 2 inches width. About 6–8 folds of amylose acetate film were used. Then the subcutaneous tissue was closed over the film using 7-strand No. 0 suture. The skin was closed with running silk. Penicillin and streptomycin were given to the dog for three days.

An autopsy of the dog seven days later showed upon repeated tests with tincture of iodine that the subcutaneous space and both intra-muscular spaces were negative for starch. The Combistix test for glucose was also negative. There was no visible evidence of any amylose acetate film. Thus the amylose acetate had been completely absorbed by the dog's tissues.

EXAMPLE 6

A midline incision 10 inches long was made on a dog (animal No. 936). A rectus sheath on both sides was incised for 8 inches and both recti muscles split longitudinally for 8 inches. A 6 × 1 inch film (flat) of amylose acetate of D.S. 0.32 was implanted deep to the recti muscles on each side. The rectus sheath was then closed with suture. Then one sheet 6 × 2 inches of amylose acetate of D.S. 0.32 was placed subcutaneously and the subcutaneous tissue closed with the suture. The skin was also closed with the same suture and the dog given penicillin and streptomycin.

An autopsy of the dog one day later showed serum (pink-tinged) present in the subcutaneous space and in both intra-muscular spaces. There was no infection. Repeated tests with tincture of iodine in the subcutaneous space and both intra-muscular spaces were negative for starch. There was no visible evidence of the amylose acetate film, it having been absorbed by the animal's tissues. Combistix tests for glucose were also negative. No hematoma was present.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for providing surgical hemostasis at the site of a wound which comprises applying to the surface of the wound amylose acetate having a degree of substitution of between about 0.2 and 1.5.

2. A process in accordance with claim 1 wherein amylose acetate having a degree of substitution of between about 0.2 and 0.6 is applied to the surface of the wound.

3. A process in accordance with claim 1 wherein there is applied to the surface of the wound a film of amylose acetate having a degree of substitution of between about 0.2 and 1.5.

4. A process in accordance with claim 3 wherein there is applied to the surface of the wound a film of between about 1 and 4 mils thick of amylose acetate having a degree of substitution of between about 0.2 and 1.5.

5. A process in accordance with claim 3 wherein there is applied to the surface of the wound a perforated film of amylose acetate having a degree of substitution of between about 0.2 and 1.5.

* * * * *